United States Patent
Chen et al.

(10) Patent No.: US 9,541,800 B2
(45) Date of Patent: Jan. 10, 2017

(54) DISPLAY PANEL

(71) Applicant: INNOLUX CORPORATION, Jhu-nan, Miao-Li County (TW)

(72) Inventors: Cheng-Hsiung Chen, Jhu-Nan (TW); Chao-Hsiang Wang, Jhu-Nan (TW); Yi-Ching Chen, Jhu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 193 days.

(21) Appl. No.: 14/307,362

(22) Filed: Jun. 17, 2014

(65) Prior Publication Data

US 2015/0362781 A1 Dec. 17, 2015

(51) Int. Cl.
*G02F 1/1339* (2006.01)
*G02F 1/1335* (2006.01)
*G02F 1/1343* (2006.01)
*G02F 1/1368* (2006.01)
*G02F 1/1337* (2006.01)
*G02F 1/1333* (2006.01)

(52) U.S. Cl.
CPC ..... *G02F 1/13394* (2013.01); *G02F 1/133784* (2013.01); *G02F 1/133512* (2013.01); *G02F 2001/133388* (2013.01)

(58) Field of Classification Search
None
See application file for complete search history.

(56) References Cited

U.S. PATENT DOCUMENTS

| 5,978,061 A | * | 11/1999 | Miyazaki | G02F 1/13394 |
| | | | | 349/106 |
| 7,710,530 B2 | | 5/2010 | Tsubata | |
| 2004/0012751 A1 | * | 1/2004 | Iizuka | G02F 1/133555 |
| | | | | 349/156 |

(Continued)

FOREIGN PATENT DOCUMENTS

| EP | 2562594 | 2/2013 |
| JP | 2005-266011 A | 9/2005 |

(Continued)

OTHER PUBLICATIONS

Report of Utility Model Technical Opinion issued by the Japan Patent Office for corresponding Japanese Utility Model Application No. 2014-003322 on Mar. 22, 2016.

*Primary Examiner* — Ryan Crockett
(74) *Attorney, Agent, or Firm* — Liu & Liu (57) ABSTRACT

A display panel includes a first substrate, a second substrate, a display medium layer, a plurality of first spacers and a plurality of second spacers. The first substrate has a display area and a non-display area disposed around the display area. The second substrate is disposed opposite to the first substrate. The display medium layer is disposed between the first substrate and the second substrate. The first spacers and the second spacers are disposed between the first substrate and the second substrate, and are located corresponding to the non-display area. The first spacers and the second spacers are correspondingly located at two opposite sides of the display area and arranged along a first direction. An extending line along a second direction perpendicular to the first direction passes through one of the first spacers and the interval between any two adjacent second spacers.

12 Claims, 5 Drawing Sheets

(56) References Cited

U.S. PATENT DOCUMENTS

| | | | |
|---|---|---|---|
| 2009/0185128 A1* | 7/2009 | Huang | G02F 1/133784 349/155 |
| 2013/0050619 A1* | 2/2013 | Kim | G02F 1/13394 349/106 |
| 2014/0043549 A1* | 2/2014 | Taniguchi | G02F 1/13394 349/15 |

FOREIGN PATENT DOCUMENTS

| | | | |
|---|---|---|---|
| JP | 2005/266011 A | | 9/2005 |
| JP | WO 2012/066985 | * | 5/2012 |
| JP | 2013-045101 A | | 3/2013 |
| JP | 2013-109380 A | | 6/2013 |
| WO | 2012/066985 | | 5/2012 |

* cited by examiner

DISPLAY PANEL

BACKGROUND

Technical Field

The present invention relates to a display panel and, in particular, to a display panel having photoresist spacers.

Related Art

With the progress of technologies, display devices have been widely applied to various kinds of fields. Especially, liquid crystal display (LCD) devices or OLED devices, having advantages such as compact structure, low power consumption, less weight and less radiation, gradually take the place of cathode ray tube (CRT) display devices, and are widely applied to various electronic products, such as mobile phones, portable multimedia devices, notebooks and TVs.

Regarding to the LCD apparatus, a conventional LCD apparatus includes an LCD panel and a backlight module disposed opposite to the LCD panel. The LCD panel mainly includes a thin film transistor (TFT) substrate, a color filter (CF) substrate and a liquid crystal layer disposed between the two substrates. The CF substrate and the TFT substrate are disposed opposite to each other, and a plurality of spacers are configured for remaining the space between the CF and TFT substrates. The CF substrate, the TFT substrate and the LC layer can form a plurality of pixel units disposed in a matrix. The backlight module emits the light passing through the LCD panel, and the pixel units of the LCD panel can display images accordingly.

In the conventional wide viewing angle technology of the LCD panel, a rubbing process is conducted for achieving the desired direction of the alignment layer disposed on the CF substrate and the TFT substrate, thereby controlling the tilt direction of the liquid crystal molecules. However, during the rubber coating procedure, the regularly arranged spacers may cause the non-uniform rubbing at two sides of the non-display area and the edges of the display area, thereby generating the undesired mura phenomenon (rubbing mura).

Besides, since the spacers are symmetrically located at two sides of the non-display area, the edge mura formed at the cell gaps of the edges of the display area becomes more obvious.

Therefore, it is an important subject to provide a display panel that can minimize the rubbing mura and improve the gap uniformity of the display panel so as to decrease the edge mura at the display area.

SUMMARY

In view of the foregoing subject, an objective of the present invention is to provide a display panel that can minimize the rubbing mura and improve the gap uniformity of the display panel so as to decrease the edge mura at the display area.

To achieve the above objective, the present invention discloses a display panel including a first substrate, a second substrate, a display medium layer, a plurality of first spacers and a plurality of second spacers. The first substrate has a display area and a non-display area disposed around the display area. The second substrate is disposed opposite to the first substrate. The display medium layer is disposed between the first substrate and the second substrate. The first spacers and the second spacers are disposed between the first substrate and the second substrate, and are located corresponding to the non-display area. The first spacers and the second spacers are correspondingly located at two opposite sides of the display area and arranged along a first direction. An extending line along a second direction perpendicular to the first direction passes through one of the first spacers and the interval between any two adjacent second spacers.

In one embodiment, the display panel further includes a black matrix layer disposed on the first substrate or the second substrate, and the black matrix layer correspondingly covers the non-display area.

In one embodiment, the display panel further includes a color filter layer disposed on the first substrate or the second substrate, and the color filter layer correspondingly covers the display area.

In one embodiment, the first spacers or the second spacers are periodically arranged along the first direction.

In one embodiment, the first spacers or the second spacers are periodically arranged along the second direction.

In one embodiment, the display panel further includes a plurality of scan lines and a plurality of data lines. The scan lines and the data lines define a plurality of pixels, and the pixels are arranged in a matrix formed by the first direction and the second direction.

In one embodiment, the first direction is substantially parallel to an extending direction of the data lines, and the second direction is substantially parallel to an extending direction of the scan lines.

In one embodiment, the first direction is substantially parallel to an extending direction of the scan lines, and the second direction is substantially parallel to an extending direction of the data lines.

In one embodiment, the width of the first spacers or the second spacers along the second direction is smaller than that of the pixels along the second direction.

In one embodiment, the extending line passes through the interval between two adjacent pixels.

In one embodiment, the extending line passes through the pixels.

In one embodiment, the display panel further includes a plurality of third spacers disposed between the first substrate and the second substrate, and the third spacers are correspondingly disposed between two adjacent pixels along the second direction.

The display area has a symmetrical axis parallel to a first direction, and two sides of the symmetrical axis are defined as a first side and a second side. The first spacers are correspondingly located at the first side while the second spacers are correspondingly located at the second side. The mirror symmetric positions of the first spacers with respect to the symmetrical axis are not overlapped with the second spacers at the second side.

In one embodiment, the distance between one of the second spacers and an adjacent one of the second spacers along the first direction is larger than the distance between said second spacer and the adjacent one of the mirror symmetric positions of the first spacers along the first direction.

In one embodiment, the first spacers are aligned with even rows of the third spacers along the second direction, and the second spacers are aligned with odd rows of the third spacers along the second direction.

In one embodiment, the first spacers are aligned with the third spacers along the second direction, and the second spacers are aligned with the center parts of the pixels along the second direction.

As mentioned above, the display panel of the invention has a plurality of first spacers and a plurality of second spacers, which are located corresponding to the non-display area. The first spacers and the second spacers are correspondingly located at two opposite sides of the display area, and an extending line along the second direction perpendicular to the first direction passes through one of the first spacers and the interval between any two adjacent second spacers. Compared with the conventional art, the spacers located at two sides of the non-display area are relatively misaligned, so that the display panel of the invention can effectively minimize the rubbing mura caused by the non-uniform brightness at the edge of the display area and improve the gap uniformity of the display panel so as to decrease the edge mura at the display area.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

The embodiments of the invention will be apparent from the following detailed description, which proceeds with reference to the accompanying drawings, wherein the same references relate to the same elements.

Figure 1A:
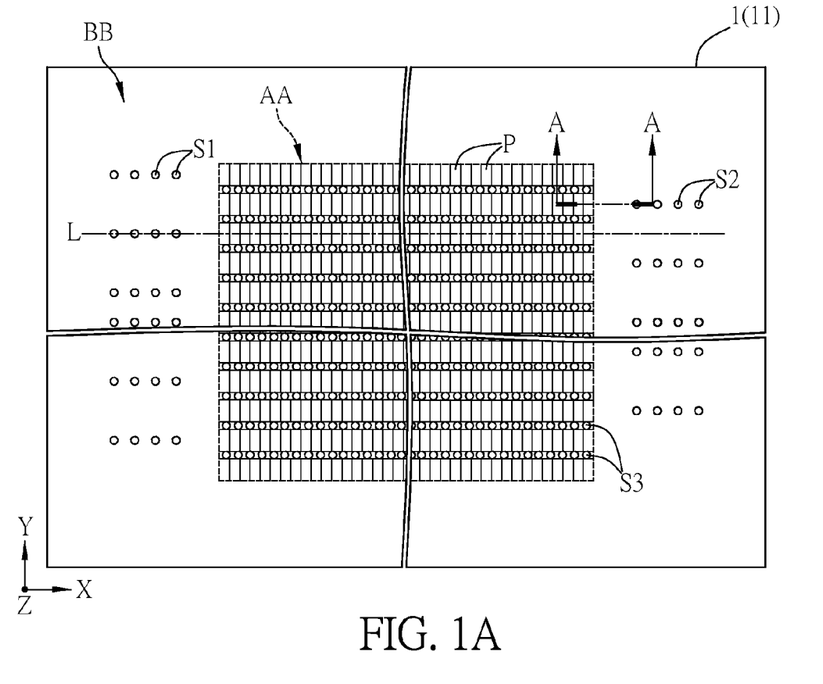
FIG. 1A is a schematic diagram showing a display panel according to a preferred embodiment of the invention.
Figure 1B:
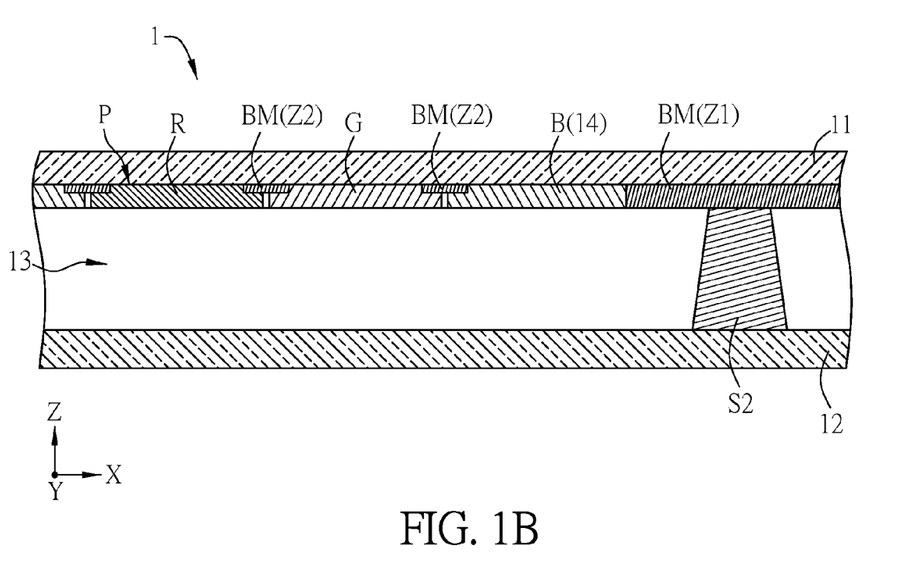
FIG. 1B is a sectional view of the display panel of FIG. 1A along the line A-A.

FIG. 1A is a schematic diagram showing a display panel 1 according to a preferred embodiment of the invention, and FIG. 1B is a sectional view of the display panel 1.

With reference to FIGS. 1A and 1B, the display panel 1 can be an LCD panel or an OLED display panel. In the following description, the display panel 1 is an LCD panel for example. To make the description more comprehensive, the display panel 1 of FIG. 1A only shows a first substrate 11, a display area AA, a non-display area BB, a plurality of pixels P, a plurality of first spacers S1, a plurality of second spacers S2 and a plurality of third spacers S3, wherein the other components of the display panel 1 are not shown in FIG. 1A. Besides, FIGS. 1A and 1B also show a first direction Y (the vertical direction in FIG. 1A), a second direction X (the horizontal direction in FIG. 1A), and a third direction Z, wherein the first direction Y, the second direction X and the third direction Z are substantially perpendicular to one another.

The display panel 1 includes a first substrate 11, a second substrate 12 and a display medium layer 13. The first substrate 11 is disposed opposite to the second substrate 12, and the display medium layer 13 is located between the first substrate 11 and the second substrate 12. The first substrate 11 has a display area (active area) AA and a non-display area BB disposed around the display area AA. In this case, the display area AA is the part of the first substrate 11 that allows light to pass through. The first substrate 11 and the second substrate 12 can be made of transparent materials, and they are, for example but not limited to, glass substrates, quartz substrates or plastic substrates.

The display medium layer 13 of this embodiment is a liquid crystal layer, which includes a plurality of liquid crystal molecules (not shown). Moreover, the display panel 1 may further include a TFT (thin-film transistor) layer (not shown) disposed on the second substrate 12. To be noted, in other embodiments, the display panel 1 is an OLED display panel, and the display medium layer 13 is an OLED layer. In this case, the first substrate 11 is a cover plate for protecting the OLED layer from being damaged by external water or particles.

The display panel 1 further includes a plurality of scan lines (not shown) and a plurality of data lines (not shown), which are interlaced to define a plurality of pixels P. The pixels P are configured between the first substrate 11 and the second substrate 12. Referring to FIG. 1A, the pixels are arranged in a matrix formed by the first direction Y and the second direction X. In this embodiment, the first direction Y is substantially parallel to the extending direction of the data lines, while the second direction X is substantially parallel to the extending direction of the scan lines. The third direction Z is perpendicular to the first direction Y and the second direction X.

Moreover, the display panel may further include a black matrix layer BM and a filter layer 14. The black matrix layer BM is disposed on the first substrate 11 or the second substrate 12, and has a light-shielding region Z1, which correspondingly covers the non-display area BB. The filter layer 14 is disposed on the second substrate 12 or at one side of the first substrate 11 facing the second substrate 12. The filter layer 14 correspondingly covers the display area AA. Since the black matrix layer BM is made of opaque materials, an opaque are (that is the non-display area BB) can be formed on the first substrate 11, thereby defining the transparent area (that is the display area AA). Moreover, the black matrix layer BM may include a plurality of light-shielding regions Z2. In this case, one pixel P is corresponding to one filter portion, and one light-shielding region Z1 is configured between two adjacent filter portions (e.g. between the filter portions R and G, between the filter portions G and B, or between the filter portions B and R). In this embodiment, the black matrix layer BM and the filter layer 14 (including a plurality of filter portions R, G and B) are disposed on the first substrate 11. Of course, in other embodiments, the black matrix layer BM or the filter layer 14 can be configured on the second substrate 12 so as to form a BOA (BM on array) substrate or a COA (color filter on array), and this invention is not limited thereto. Furthermore, the display panel 1 may further include a protective layer (e.g. an over coating layer, not shown) covering the black matrix layer BM and the filter portions R, G and B. The material of the protective layer includes photoresist materials, resin materials or inorganic materials (e.g. SiOx/SiNx). The protective layer is configured for protecting the black matrix layer BM and the filter portions R, G and B from the effect of the following processes and being damaged.

In this embodiment, when the scan line of the display panel 1 receives a scan signal, the transistor corresponding to the scan line is turned on, so that the data signals can be transmitted to the pixel electrodes of the corresponding pixels P. Accordingly, the display panel 1 can display the desired image.

In addition, the display panel 1 further includes a plurality of first spacers S1 and a plurality of second spacers S2. The first spacers S1 and the second spacers S2 are disposed between the first substrate 11 and the second substrate 12, and located corresponding to the non-display area BB. To be noted, the first spacers S1 and the second spacers S2 are located corresponding to the non-display area BB instead of the filter layer 14. In other words, in the top view of the first substrate 11 (from the third direction Z), if some filter portions R, G, B around the display area AA are covered by the black matrix layer BM, although some spacers disposed along the first direction Y may be arranged corresponding to the filter portions R, G, B covered by the black matrix layer BM, these spacers are definitely not the first spacers S1 neither the second spacers S2 defined in the invention.

The first spacers S1 and the second spacers S2 of the embodiment are parts of the spacers located in the non-display area BB, which are closest to the edges of the display area AA along the second direction X. As mentioned above, the first spacers S1 are correspondingly located at the left side of the display area AA, while the second spacers S2 are correspondingly located at the right side of the display area AA. Moreover, the display panel 1 may further include a plurality of third spacers S3 disposed between the first substrate 11 and the second substrate 12. Each third spacer S3 is correspondingly located between two adjacent pixels P along the second direction X, so that the third spacers S3 are parts of the spacers that are located in the display area AA. The first spacers S1, the second spacers S2 and the third spacers S3 can remain the gap between the first substrate 11 and the second substrate 12, so that the display medium layer 13 (e.g. liquid crystal molecules of the liquid crystal layer) can be filled between the substrates.

In addition, the first spacers S1 and the second spacers S2 are periodically arranged along the first direction Y, and they are also periodically arranged along the second direction X. Of course, in other embodiments, the first spacers S1 or the second spacers S2 may be not periodically arranged along the first direction Y or the second direction X. Besides, the width of each first spacer S1 or each second spacer S2 along the second direction X is smaller than the width of a pixel P along the second direction X.

An extending line L along the second direction X passes through one of the first spacers S1, and it also passes through the interval between two second spacers S2. In this embodiment, as shown in FIG. 1A, the extending line L passes through some of the first spacers S1 and a row of pixels P, but it does not pass through any of the second spacers S2. As a result, the first spacers S1 and the second spacers S2 are misaligned (not located on the same extending line L) along the second direction X.

Figure 1C:
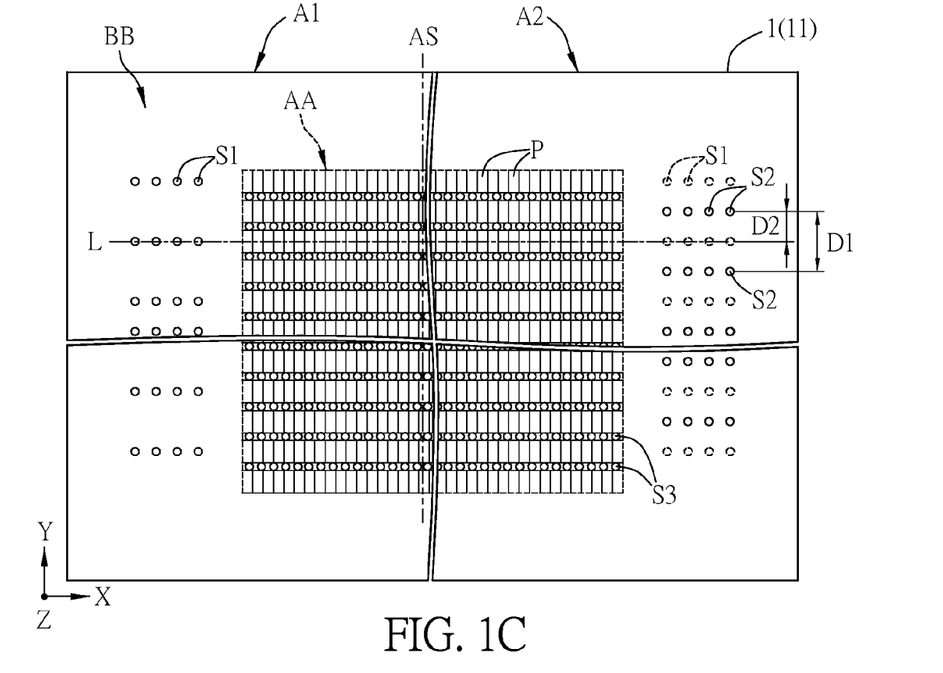
FIG. 1C is a schematic diagram showing another aspect of the display panel according to the embodiment of the invention.

FIG. 1C is a schematic diagram showing another aspect of the display panel 1. Referring to FIG. 1C, the display area AA of the first substrate 11 has a symmetrical axis AS parallel to the first direction Y, and two sides of the symmetrical axis AS are defined as a first side A1 and a second side A2. The "symmetrical axis" is defined as that the pixels P located at one side of the symmetrical axis are totally symmetric to the pixels P located at the other side of the symmetrical axis (the pixels P located at two sides of the symmetrical axis are symmetrized and have the same number). The first spacers S1 and the second spacers S2 are correspondingly disposed in the non-display area BB, wherein the first spacers S1 are correspondingly located at the first side A1, while the second spacers S2 are correspondingly located at the second side A2. Besides, the first spacers S1 and the second spacers S2 are periodically arranged along the first direction Y. Accordingly, as the first spacers S1 located at the first side A1 are mirror imaged to the second side A2 with respect to the symmetrical axis AS, the mirror symmetric positions of the first spacers S1 with respect to the symmetrical axis AS are misaligned and not overlapped with the second spacers S2. In this case, when an extending line L along the second direction X perpendicular to the first direction Y passes through one of the first spacers S1, it also passes through the interval between any two adjacent second spacers S2. As shown in FIG. 1C, the first spacers S1 located at the first side A1 are mirror imaged to the second side A2 with respect to the symmetrical axis AS to build a plurality of mirror symmetric positions (also labeled as S1). The distance D1 between two adjacent second spacers S2 along the first direction Y is larger than the distance D2 between one of the second spacers S2 and the adjacent mirror symmetric position S1 along the first direction Y (D1>D2). The other technical features of the display panel 1 as shown in FIG. 1C can be referred to the description relating to FIGS. 1A and 1B, so the detailed description thereof will be omitted.

FIGS. 2A to 2F are schematic diagrams showing different aspects (display panels 1a-1f) of the embodiment of the invention.

Figure 2A:
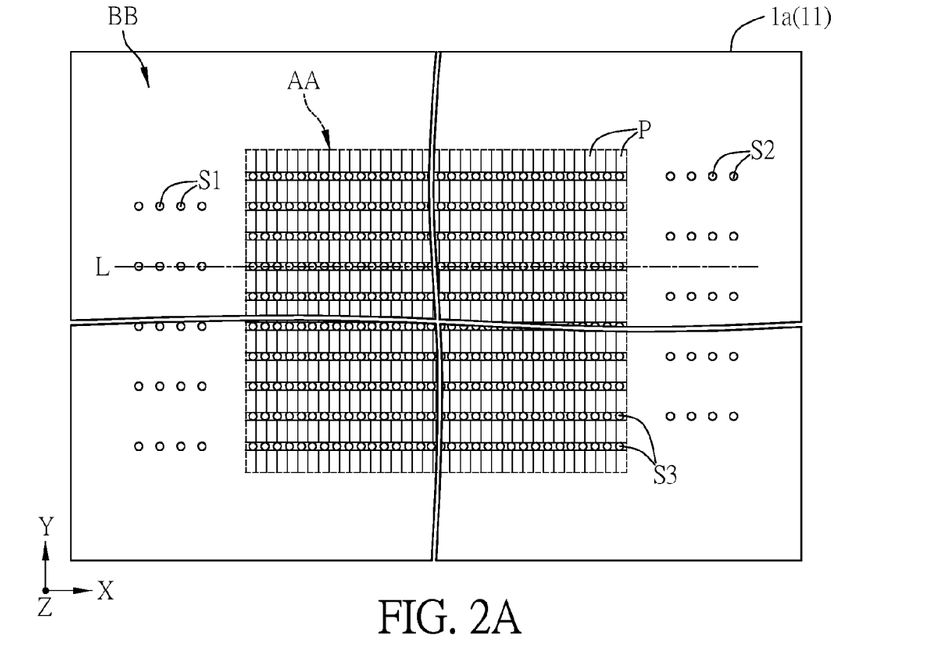
FIGS. 2A to 2F are schematic diagrams showing different aspects of the embodiment of the invention.

Referring to FIG. 2A, the display panel 1a is different from the display panel 1 of FIG. 1A in that the extending line L along the second direction X passes through the first spacers S1, the interval between two adjacent pixels P (the interval may be covered by the light-shielding region Z2 of the black matrix layer BM), and the interval between two adjacent second spacers S2. In addition, the first spacers S1 are aligned with even rows of the third spacers S3 along the second direction X, and the second spacers S2 are aligned with odd rows of the third spacers S3 along the second direction X. The other technical features of the display panel 1a can be referred to the description relating to the same component in the display panel 1, so the detailed description thereof will be omitted.

Figure 2B:
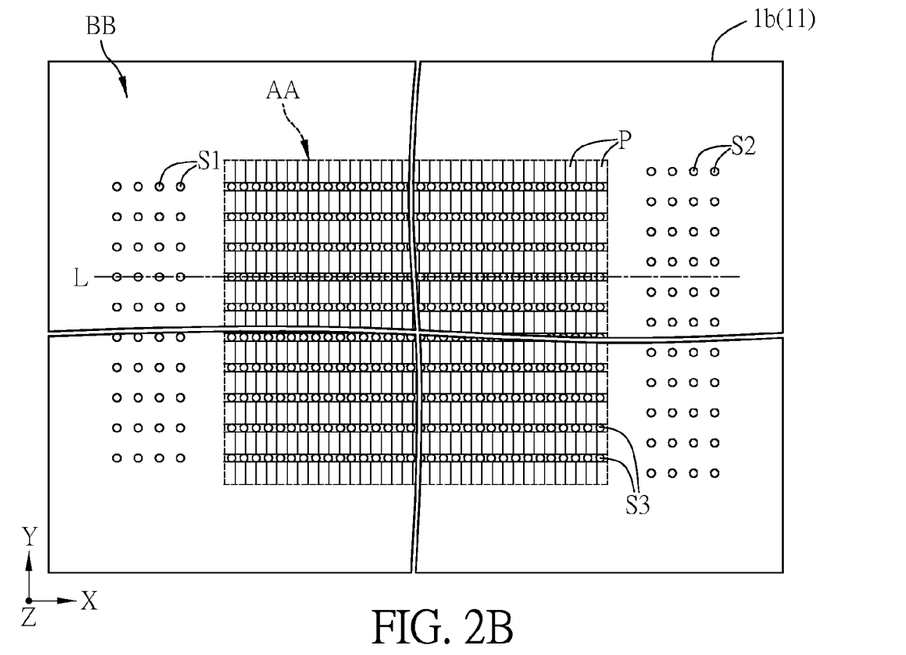

Referring to FIG. 2B, different from the display panels 1 and 1a, the density of the first spacers S1 in the display panel 1b is twice as that of the first spacers S1 in the display panel 1a, and the density of the second spacers S2 in the display panel 1b is twice as that of the second spacers S2 in the display panel 1. In other aspects, only the density of the first spacers S1 in the display panel 1b is twice as that of the first spacers S1 in the display panel 1a, or only the density of the second spacers S2 in the display panel 1b is twice as that of the second spacers S2 in the display panel 1. Moreover, the density of the first spacers S1 or the second spacers S2 in the display panel 1b can also be three or more times of that in the display panel 1 or 1a. The other technical features of the display panel 1b can be referred to the description relating to the same component in the display panel 1 or 1a, so the detailed description thereof will be omitted.

Figure 2C:
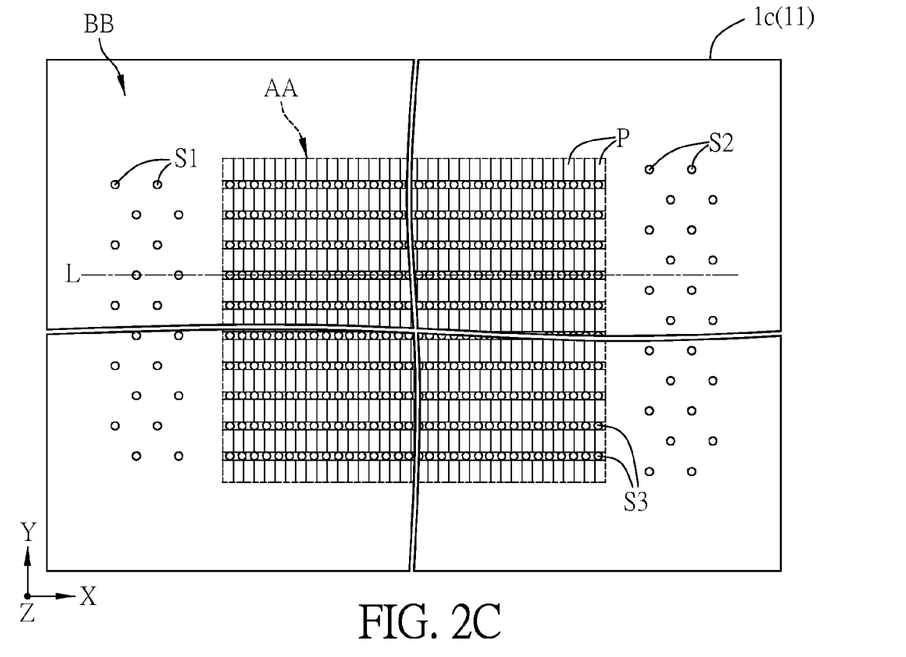

Referring to FIG. 2C, different from the display panel 1b of FIG. 2B, the density of the first spacers S1 in the display panel 1c along the first direction Y is a half of that of the first spacers S1 of the same column in the display panel 1b along the first direction Y, and the density of the second spacers S2 in the display panel 1c along the first direction Y is a half of that of the second spacers S2 of the same column in the display panel 1b along the first direction Y. Besides, the first spacers S1 and the second spacers S2 of two adjacent columns are misaligned along the first direction Y. In addition, the first spacers S1 are aligned with the third spacers S3 along the second direction X, and the second spacers S2 are aligned with the center parts of the pixels P along the second direction X. The other technical features of the display panel 1c can be referred to the description relating to the same component in the display panel 1b, so the detailed description thereof will be omitted.

Figure 2D:
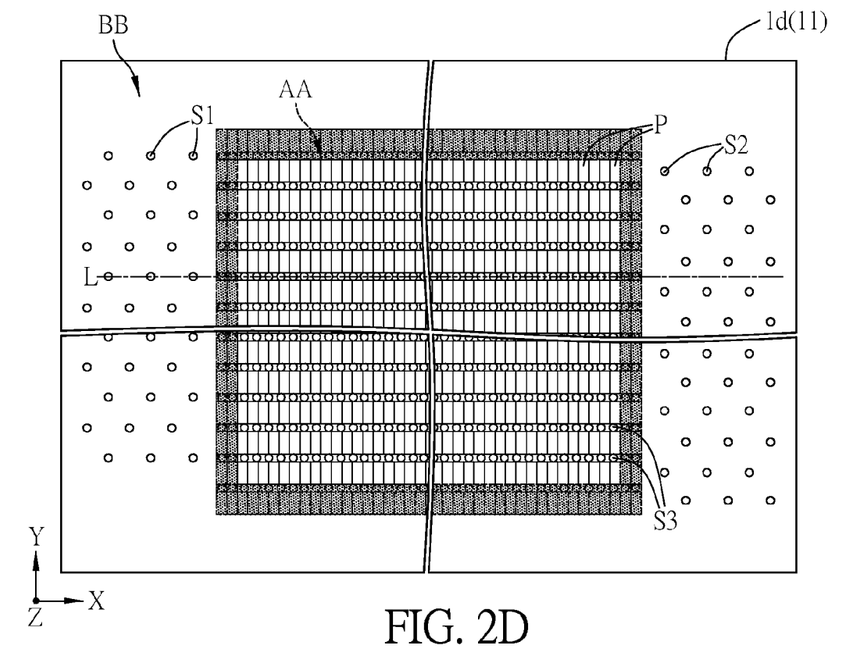

Referring to FIG. 2D, different from the display panel 1c of FIG. 2C, a part of the filter layer 14 (outer edges) of the display panel 1*d* along the third direction Z is covered by the light-shielding region Z1 of the black matrix layer BM. Accordingly, the non-display area BB corresponds to the part of filter layer 14 covered by the light-shielding region Z1 of the black matrix layer BM, and the display area AA corresponds to the residual part of filter layer 14 that is not covered by the light-shielding region Z1 of the black matrix layer BM. The other technical features of the display panel 1*d* can be referred to the description relating to the same component in the display panel 1*c*, so the detailed description thereof will be omitted.

Figure 2E:
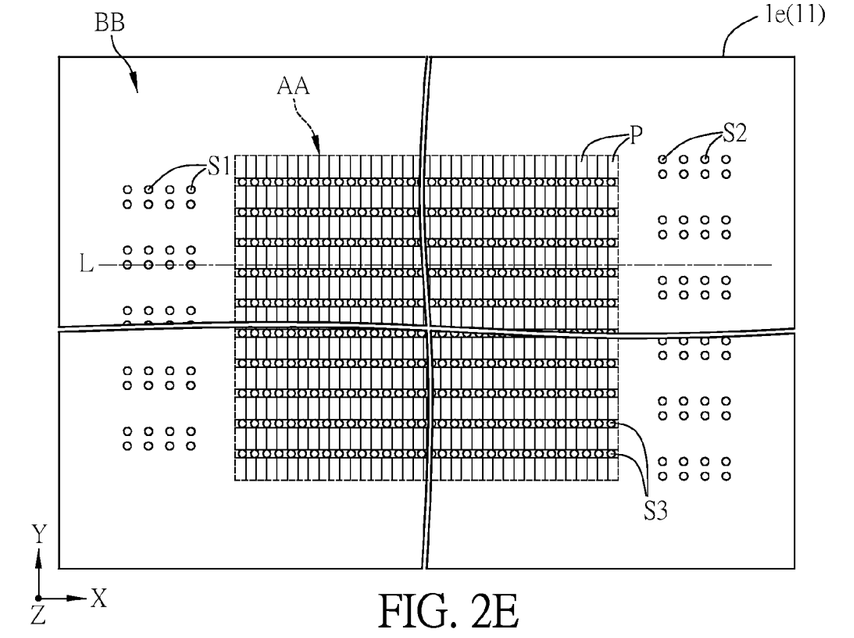

Referring to FIG. 2E, different from the display panel 1 of FIG. 1A, the width of one pixel P of the display panel 1*e* along the first direction Y contains two first spacers S1 and this width also contains two second spacers S2. In addition, the first spacers S1 and the second spacers S2 are misaligned along the first direction Y. The other technical features of the display panel 1*e* can be referred to the description relating to the same component in the display panel 1, so the detailed description thereof will be omitted.

Figure 2F:
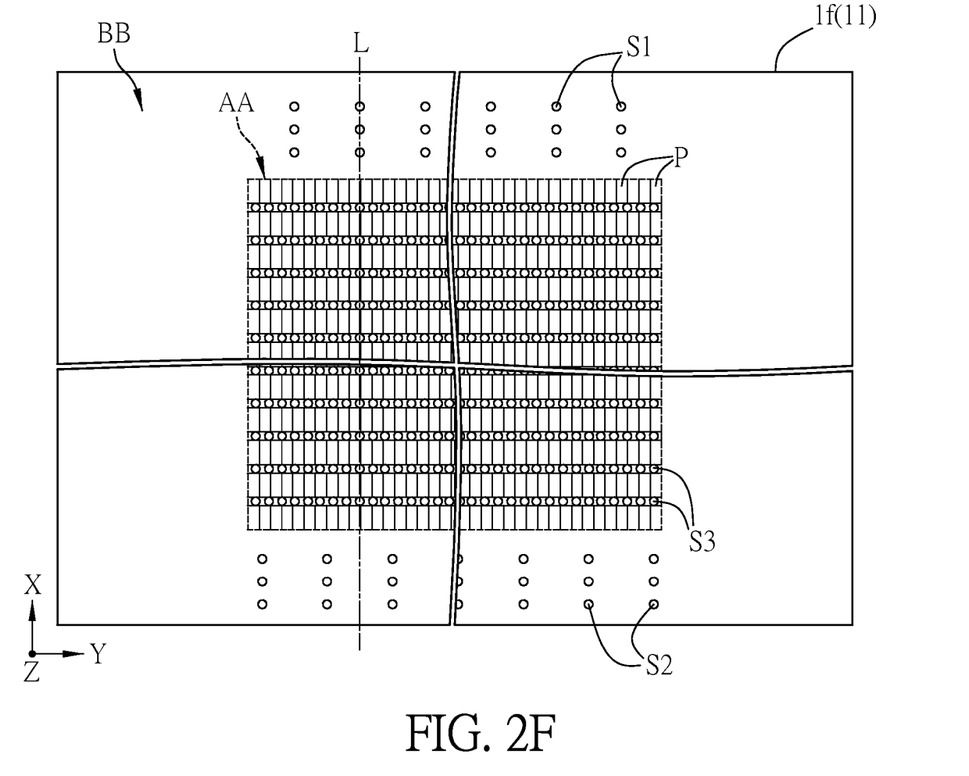

Referring to FIG. 2F, different from the display panel 1 of FIG. 1A, the first direction Y of the display panel 1*f* is substantially parallel to the extending direction of the scan lines, and the second direction X thereof is substantially parallel to the extending direction of the data lines. In other words, the first spacers S1 and the second spacers S2 are correspondingly disposed at the top side and the bottom side of the display panel 1*f*, respectively, and the extending line L extends along the second direction X (vertical direction) and passes through the first spacers S1 and the interval between two second spacers S2. The other technical features of the display panel 1*f* can be referred to the description relating to the same component in the display panel 1, so the detailed description thereof will be omitted.

To be noted, in the above mentioned aspects, the numbers, densities and arrangements (positions) of the first spacers S1 and the second spacers S2 are only for illustrations and are not to limit the scope of the invention.

Figure 3:
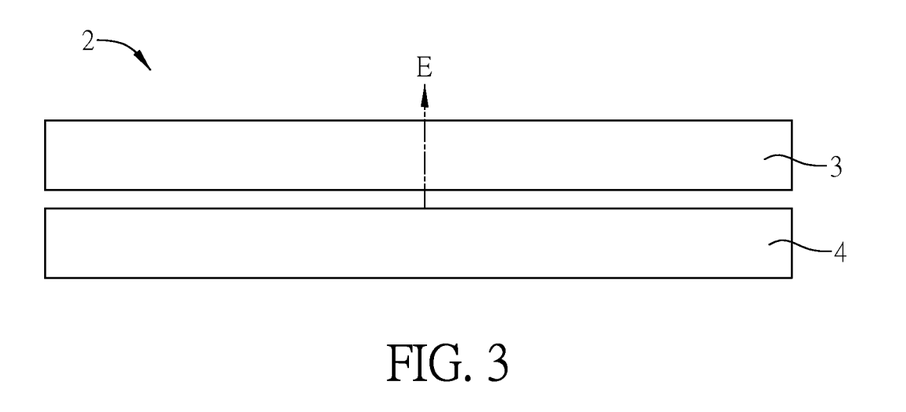
FIG. 3 is a schematic diagram showing a display device according to the embodiment of the invention.

FIG. 3 is a schematic diagram showing a display device 2 according to the embodiment of the invention.

The display device 2 includes a display panel 3 and a backlight module 4, which are disposed opposite to each other. In this case, the display device 2 is an LCD device, and the display panel 3 may include one of the above-mentioned display panels 1 and 1*a*-1*f*. The technical descriptions thereof can be referred in this embodiment, and they are not repeated here. When the backlight module 4 emits the light E to pass through the display panel 3, the pixels of the display panel 3 can display the corresponding colors so as to form the images.

In summary, the display panel of the invention has a plurality of first spacers and a plurality of second spacers, which are located corresponding to the non-display area. The first spacers and the second spacers are correspondingly located at two opposite sides of the display area, and an extending line along the second direction perpendicular to the first direction passes through one of the first spacers and the interval between any two adjacent second spacers. Compared with the conventional art, the spacers located at two sides of the non-display area are relatively misaligned, so that the display panel of the invention can effectively minimize the rubbing mura caused by the non-uniform brightness at the edge of the display area and improve the gap uniformity of the display panel so as to decrease the edge mura at the display area.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display panel, comprising:
   a first substrate having a display area and a non-display area disposed around the display area;
   a second substrate disposed opposite to the first substrate;
   a display medium layer disposed between the first substrate and the second substrate; and
   a plurality of spacers, which are disposed between the first substrate and the second substrate, and located corresponding to the non-display area at two opposite sides of the display area and arranged along a first direction, wherein all spacers located at one of the two sides correspond to first spacers and all spacers located at the other one of the two sides correspond to second spacers,
   wherein an extending line along a second direction perpendicular to the first direction passes through at least one of the first spacers and an interval between any two adjacent second spacers,
   wherein the display area has a symmetrical axis parallel to the first direction, two sides of the symmetrical axis are defined as a first side and a second side, and the first spacers are correspondingly located at the first side while the second spacers are correspondingly located at the second side, and a plurality of mirror symmetric positions of the first spacers with respect to the symmetrical axis are not overlapped with the second spacers at the second side, and
   wherein the extending line does not pass through any second spacer.

2. The display panel of claim 1, further comprising:
   a black matrix layer disposed on the first substrate or the second substrate, wherein the black matrix layer correspondingly covers the non-display area.

3. The display panel of claim 1, wherein the first spacers or the second spacers are periodically arranged along the first direction.

4. The display panel of claim 1, further comprising:
   a color filter layer disposed on the first substrate or the second substrate, wherein the color filter layer correspondingly covers the display area.

5. The display panel of claim 1, further comprising:
   a plurality of scan lines and a plurality of data lines, wherein the scan lines and the data lines define a plurality of pixels, and the pixels are arranged in a matrix formed by the first direction and the second direction.

6. The display panel of claim 5, wherein the first direction is substantially parallel to an extending direction of the data lines, and the second direction is substantially parallel to an extending direction of the scan lines.

7. The display panel of claim 5, wherein the first direction is substantially parallel to an extending direction of the scan lines, and the second direction is substantially parallel to an extending direction of the data lines.

8. The display panel of claim 5, wherein the width of the first spacers or the second spacers along the second direction is smaller than that of the pixels along the second direction.

9. The display panel of claim 5, further comprising:
   a plurality of third spacers disposed between the first substrate and the second substrate, wherein the third spacers are correspondingly disposed between adjacent two of the pixels along the second direction.

10. The display panel of claim 9, wherein the first spacers are aligned with even rows of the third spacers along the second direction, and the second spacers are aligned with odd rows of the third spacers along the second direction.

11. The display panel of claim 9, wherein the first spacers are aligned with the third spacers along the second direction, and the second spacers are aligned with the center parts of the pixels along the second direction.

12. The display panel of claim 1, wherein the distance between one of the second spacers and an adjacent one of the second spacers along the first direction is larger than the distance between the one of the second spacers and an adjacent one of the mirror symmetric positions of the first spacers along the first direction.

* * * * *